June 28, 1960  C. T. CROFT  2,942,388
VALVE LAPPING APPARATUS
Filed Aug. 27, 1958  6 Sheets-Sheet 1

Inventor
Charles T. Croft
By Edmunds, Morton,
Barrows and Taylor
Attorneys

June 28, 1960

C. T. CROFT 2,942,388

VALVE LAPPING APPARATUS

Filed Aug. 27, 1958

Inventor
Charles T. Croft
By
Attorneys

June 28, 1960 C. T. CROFT 2,942,388
VALVE LAPPING APPARATUS
Filed Aug. 27, 1958 6 Sheets-Sheet 5

Inventor
Charles T. Croft
By
Pennie, Edmonds, Morton,
Barrows and Taylor
Attorneys

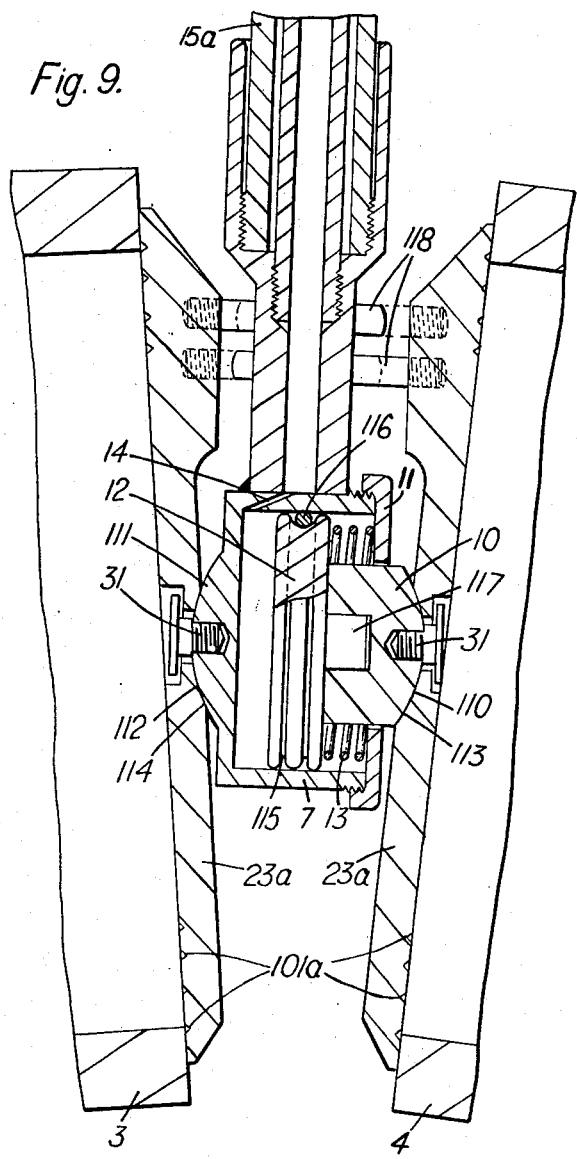

United States Patent Office 2,942,388
Patented June 28, 1960

2,942,388

VALVE LAPPING APPARATUS

Charles T. Croft, Seven Kings, Ilford, England, assignor to Dewrance & Co., Limited, London, England, a British company Filed Aug. 27, 1958, Ser. No. 757,509

12 Claims. (Cl. 51—241)

This invention relates to valve lapping apparatus, particularly for use in lapping opposed valve seats, e.g. seats of parallel slide valves, or seats of wedge valves.

It is a main object of the present invention to provide a lapping apparatus which can be readily fitted to a valve in situ, which is relatively cheap to produce, and which can be operated either manually or by small power units.

The invention includes apparatus for lapping opposed valve seats, wherein the laps are connectable to supports therefor carried by a mounting in a manner such that one lap is movable towards and away from the other and is spring-controlled for movement to an inactive position thereof thereby to facilitate location of the apparatus relative to the seats and removal therefrom, said mounting being adapted for connection with actuating means operable to effect movement thereof relative to opposed valve seats to effect lapping of the seats and for connection with a source of fluid pressure application of which to the mounting is operative to urge the laps into lapping relation with the valve seats and to maintain the desired lapping relation between the laps and the seats.

The invention also includes apparatus for lapping opposed valve seats, wherein the laps are connectable to supports therefor carried by a mounting in a manner such that one lap is movable towards and away from the other, said mounting being adapted for connection with a source of fluid pressure application of which to the mounting is operative to urge the laps into lapping relation with the valve seats and to maintain the desired lapping relation between the laps and the seats, and comprising a cylinder having one closed end adapted to have one lap attached thereto, an axially movable piston housed in the cylinder and a rod connected to the piston and having its outer end projecting through the other end of the cylinder and adapted to have the other of the laps attached thereto, and there are provided a shaft, secured to the cylinder, a rotatable eccentric connected to the shaft and having its axis of rotation at right angles to the axis of the shaft, and a pivot having its axis at right angles to the axis of the shaft and co-operating with the shaft at a position between the eccentric and the cylinder, said eccentric and pivot co-operating to impart a gyratory movement to the cylinder relative to valve seats thereby to effect lapping of the seats.

In order that the invention may be clearly understood, some embodiments thereof will now be described, by way of example, with reference to the accompanying partly diagrammatic drawings in which:

Figure 6 is a section on line VI—VI, Figure 5, and with a reference to the accompanying diagrammatic drawings, in which

Figure 9 is a sectional elevation of a form of lapping apparatus adapted for use with wedge valves.

In the drawings the same or similar parts are indicated by like reference numerals.

Figure 1:
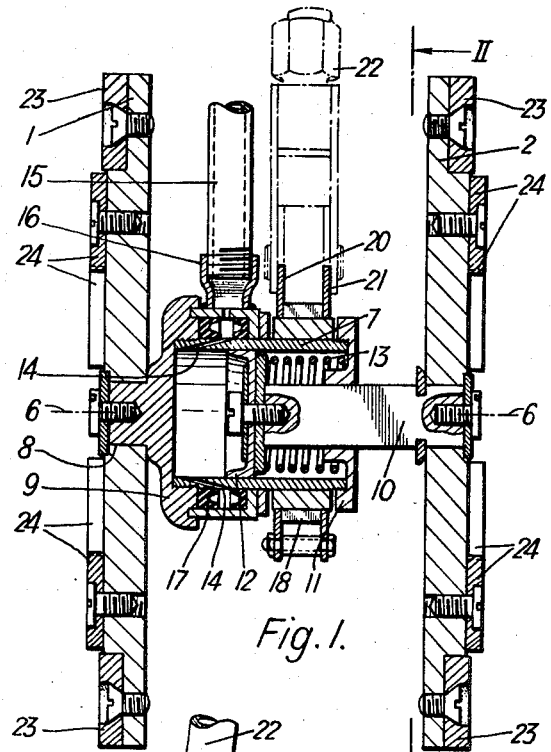
Figure 1 is a section through lapping apparatus according to the invention.
Figure 2:
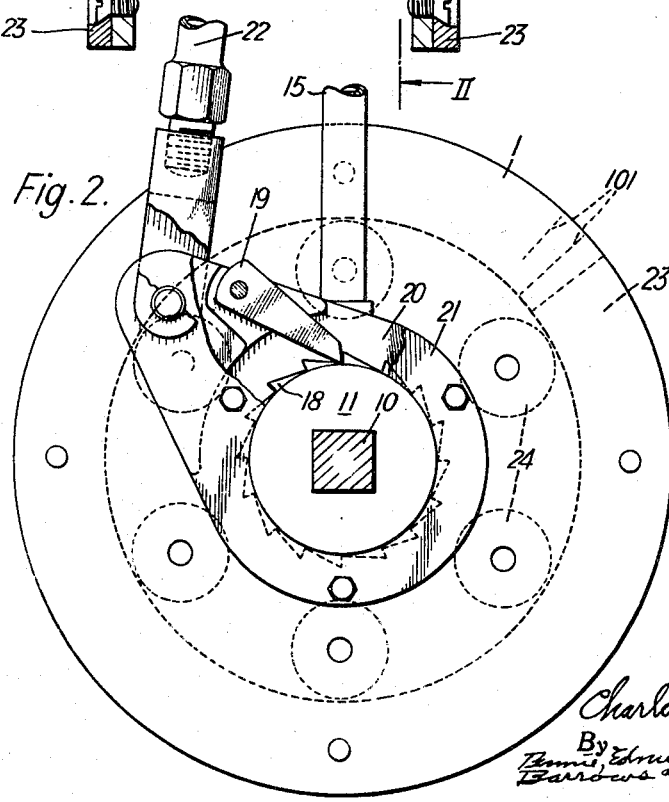
Figure 2 is a section on line II—II, Figure 1.
Figure 3:
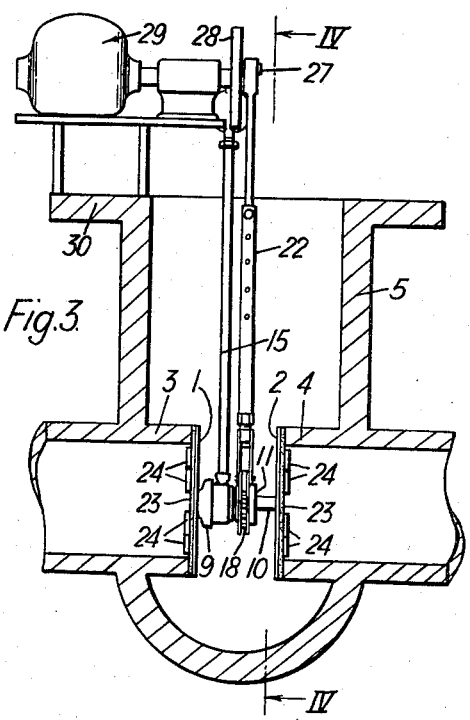
Figure 3 is a diagrammatic view illustrating the mode of application of the lapping apparatus to a valve.

Referring to Figures 1 to 4 of the drawings the lapping apparatus therein illustrated comprises two interconnected laps consisting of discs 1, 2, adapted for location relative to opposed valve seats 3, 4, Figure 3, forming part of a valve body 5. The discs 1, 2 are supported for rotation about a common axis 6, Figure 1, by a mounting shown as a cylinder 7, the disc 1 being attached to a support therefor carried by the cylinder and shown as a square spigot 8 extending from a cover 9 which is screwed on to one end of the cylinder 7. The disc 2 is attached to a support shown as a rod 10 of square cross-section which is slidable lengthwise in a cover 11 also screwed to an end of the cylinder 7. The inner end of the rod 10 has secured thereto a piston formed by a cup washer 12, the arrangement being such that the disc 2, rod 10, and piston 12 are movable along the axis 6 relative to the disc 1. The disc 2 and piston 12 are normally urged towards the disc 1, that is to an inactive position of disc 2, by a spring 13 and movement of the disc 2 and piston 12 away from the disc 1, to the active position thereof, is effected by fluid pressure acting on the piston 12 against the action of spring 13. For purposes of illustration it will be assumed that the fluid pressure is air pressure, but it will be understood that, if desired, the fluid pressure may be hydraulic. Compressed air to effect movement of the piston 12 away from disc 1 enters the cylinder through ports or apertures 14 extending therethrough and communicating with a conduit 15, the conduit 15 being suitably adapted for connection with a source of compressed air. The conduit 15 communicates with the apertures 14 through a nozzle 16, Figure 1, connection between the nozzle 16 and the cylinder being effected through any suitable form of fluid-tight seal 17.

Rotation of the discs about the axis 6 is effected by a ratchet wheel 18 secured to the cylinder 7 and a ratchet pawl 19, Figure 2, which is supported by a pair of plates 20, 21 supported for rocking movement about the axis 6. The plates 20, 21 are pivotally connected to a connecting rod 22 by which rocking of the plates is effected.

The discs 1, 2 have abrasive elements 23 secured to the outer faces thereof to effect lapping of the valve seats. Each abrasive element 23 is of annular form and consists of cast iron and its face adapted to engage the valve seat is provided, as is usual with the lapping member, with grooves in which lapping compound is placed; said grooves, which may be 3/64 inch deep and wide, and of the order of 1/2 inch apart over the whole abrasive element face, are in the instant case radial. Also extending from the outer faces of the discs 1, 2 are rollers 24 which are adapted to locate the laps relative to the valve seats, to support the laps for rotation about the axis 6, and to determine the extent of oscillation of the laps relative to the seats during rotation of the laps.

Figure 4:
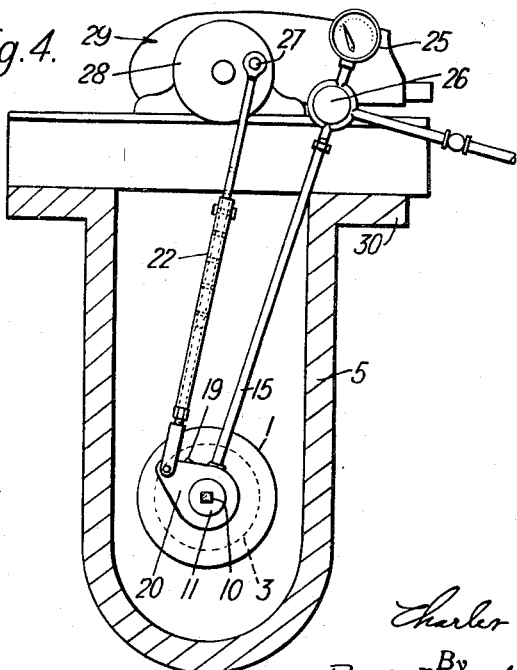
Figure 4 is a section on line IV—IV, Figure 3.

The operation of the apparatus will now be described with reference to the diagrammatic Figures 3 and 4. When the valve seats 3, 4 of a valve body 5 are to be lapped the valve cover and valve gear, not shown, are removed and the lapping apparatus is inserted into the valve body. The rollers 24 on the disc 1 are located, as illustrated in Figure 3 in the valve seat 3 and at this time the disc 2 is urged towards the disc 1, that is to the inactive position thereof, by the spring 13 so that it does not engage the valve seat 4. The nozzle 16 is then connected by the conduit 15 to a source, not shown, of compressed air, and the conduit preferably includes a pressure gauge 25, Figure 4, and a manually operable regulator 26. After connection of the apparatus to the source of compressed air the regulator 26 is opened and compressed air is permitted to pass into the cylinder 7 so as to move the piston 12 and the disc 2 along the axis 6 away from the disc 1 until, as illustrated in Figure 3, the rollers 24 on the disc 2 are located in the valve seat 4 and the abrasive elements 23 of each of the discs 1, 2 are engaged with the valve seats to be lapped. The air pressure is so applied as, during lapping, to maintain the desired lapping relation between the laps and the valve seats. It will be understood that by regulating the air pressure acting on the piston 12 lapping of the seats may be effected with abrasive elements 23 consisting of a coarse compound to effect heavy lapping, or with a fine compound to effect light lapping of the seats.

When the apparatus is located relative to the seats 3, 4 as just described, the apparatus is supported for rotation about the axis 6 by co-operation between the interior of the valve seats and the rollers 24 and rotation of the apparatus is effected by reciprocatiion of the connecting rod 22. Reciprocation of rod 22 can be effected manually or, if desired, the connecting rod 22 may be connected, as illustrated in Figures 3 and 4, with an eccentric pin 27 carried by a disc 28 secured to a pneumatic drill or the like 29 which is rigidly but adjustably mounted in any suitable manner on the flange 30 of the valve body. The circle formed by the peripheries of the rollers 24 is of slightly lesser diameter than that of the bore of the seats to be lapped and the rollers therefore serve not only to support the apparatus relative to the seats to be lapped but, during rotation of the laps, assist in causing an oscillating motion which avoids tracking or scoring of the seats during lapping. This is because the upstroke of the connecting rod 22 causes the cylinder to raise the rollers from the bottoms of valve bores in a manner such that the discs ride upwards and across the seats while on the down stroke the discs are caused to ride downwards and across the seats.

Figure 5:
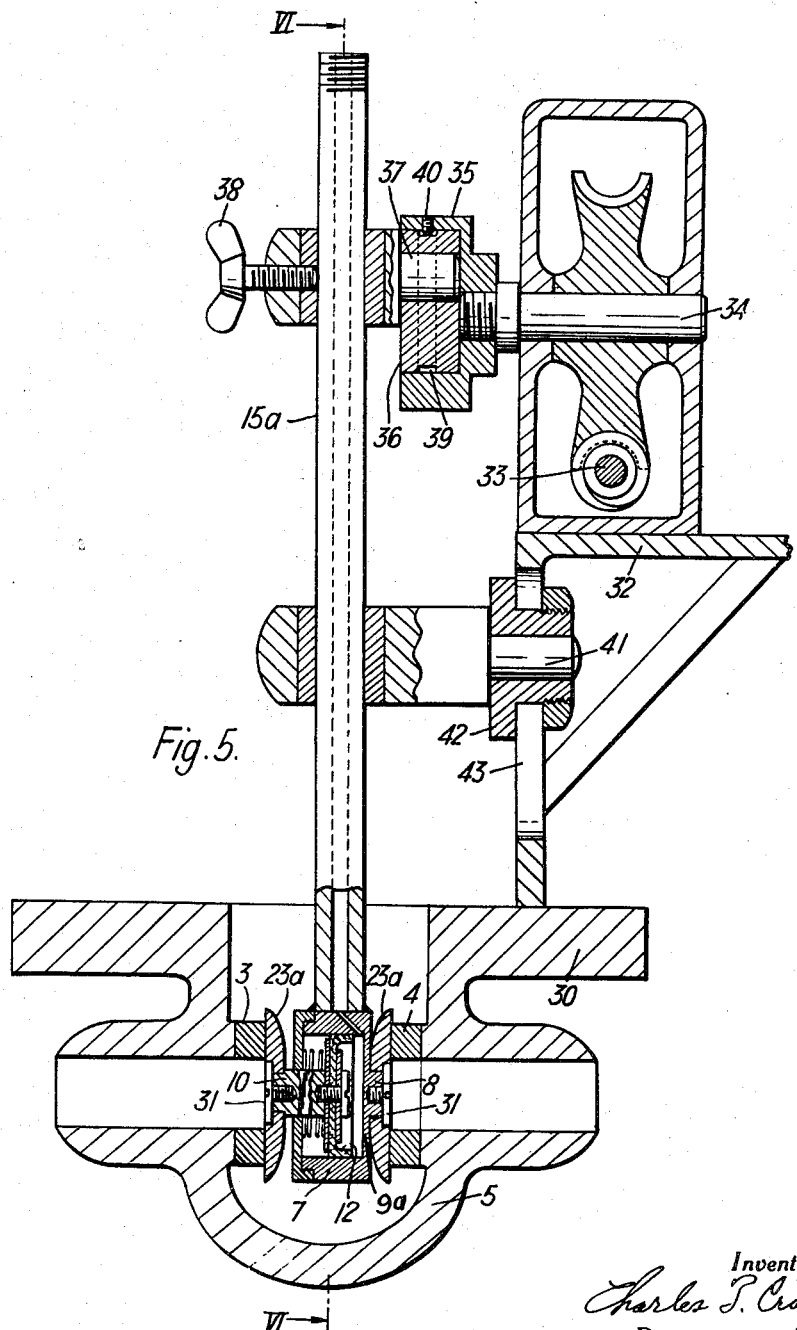
Figure 5 is a section on line V—V, Figure 6, through an alternative form of apparatus according to the invention.
Figure 6:
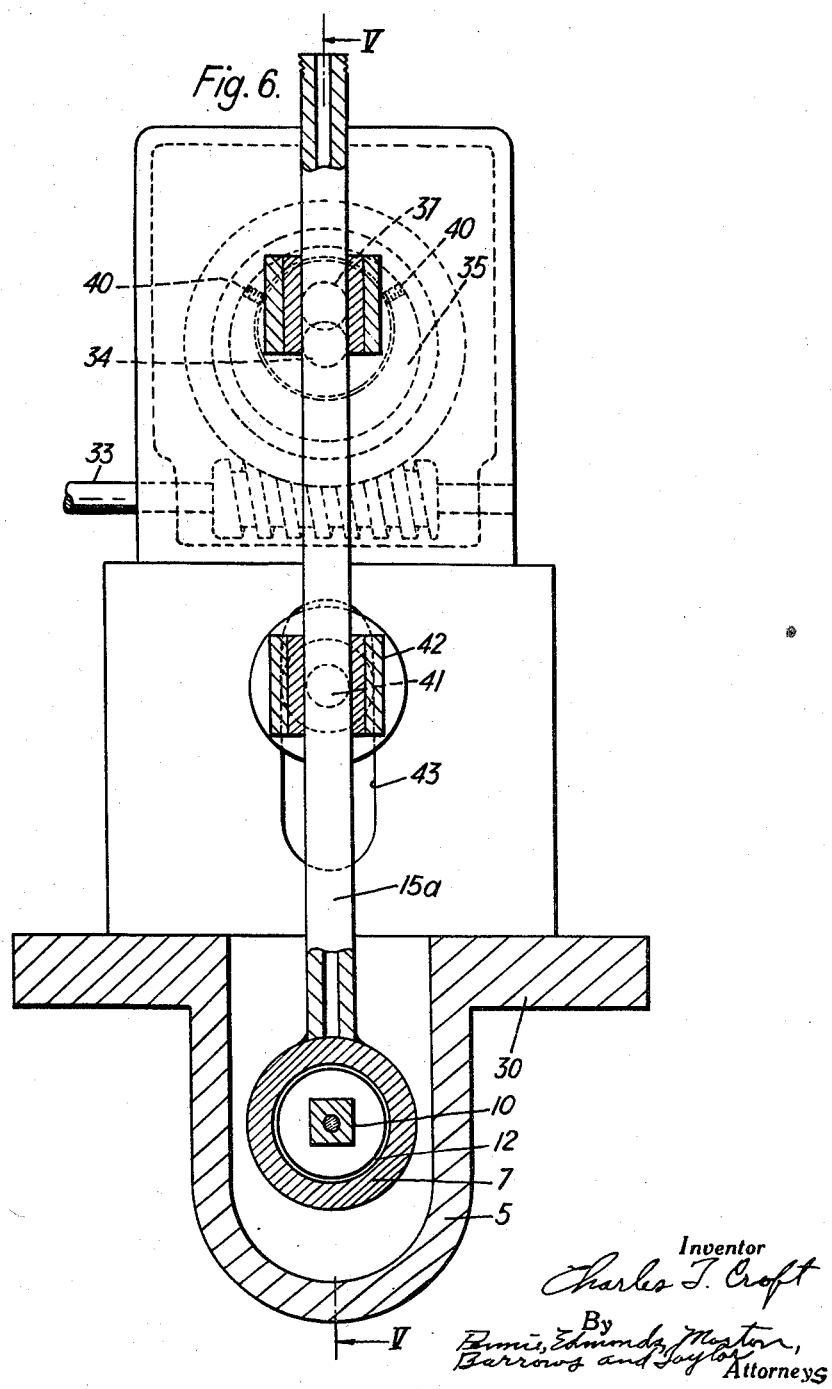

Referring to the alternative embodiment of the invention illustrated in Figures 5 and 6, this is designed primarily for lapping the seats of small parallel-slide valves. The apparatus comprises laps formed by abrasive discs 23a attached by screws 31, Figure 5, to supports formed respectively by a square spigot 8 extending from the closed end 9a of a mounting formed by a cylinder 7, and by the outer end of a rod 10, of square cross-section, connected to a piston 12 housed in the cylinder. The grooves for lapping compound on these discs 23a are concentric with the disc axes, as indicated by the reference numeral 101a in Figure 7 which indicates similar abrasive discs 23a.

In this embodiment of the invention fluid pressure is applied to the cylinder through a tubular shaft 15a adapted for connection, as described with reference to Figures 1 to 4, to a source of fluid pressure through a pressure regulator (in this case not shown). The lapping apparatus is carried by a bracket 32 adapted in any suitable anner to be adjustably secured to the top of the valve to be lapped, and mounted on the bracket is a reducing gear the shaft 33, Figure 6, of which is connected to an electric motor, not shown. To the shaft 34 of the reducing gear there is secured an eccentrically bored housing 35 in which is located an eccentric bush 36 carrying an eccentric pin 37 which is clamped, as by a screw 38, to the shaft 15a. Bush 36 has a peripheral groove 39, Figure 5, to receive screws 40 which retain the bush in position relative to the housing 35.

Between the eccentric 35, 36, 37 and the cylinder 7 is a pivot 41 through which the shaft 15a passes and, as can be seen from Figure 5, the axes of the shaft 34 and pivot 41 are at right angles to the axis of shaft 15a. The pivot 41 is pivoted in a bush 42 clamped to bracket 32 to be adjustable lengthwise of a slot 43 formed in the bracket.

With this embodiment of the invention, after removal of the valve cover and valve gear from a valve to be lapped the bracket 32 is mounted on the valve and by adjustment of the shaft 15a the lapping discs 23a are centralized relative to the valve seats 3 and 4. The shaft 15a is then connected to the source of fluid pressure and the discs 23a moved into lapping relation with the seats as described above. Preferably the bracket is not finally secured to the valve flange 30 until after the fluid pressure has been applied, so that it can be known that in the machine ready for operation the shaft 15a is not unduly flexed. The motor is then started and rotation of eccentric 35, 36, 37 causes vertical reciprocating movement to be imparted to the cylinder 7 and lapping discs 23a. This movement is converted into a gyratory movement by angular movement of pivot 41 about its axis thereby to impart the desired gyratory rubbing action by which lapping is effected without tracking or scoring of the valve seats.

When lapping is complete the motor is stopped and the fluid pressure in cylinder 7 is relieved so that spring 13 restores the lapping disc secured to rod 10 to the inactive position thereof, thereby to facilitate removal of the apparatus from the valve.

It will be understood that the apparatus desirably should be suitable for use with a range of sizes or small valves and the apparatus just described is capable of such use because the vertical stroke of the shaft 15a can be adjusted by angular movement of bush 36 relative to housing 35, and the extent of cross movement of the lapping discs can be adjusted by movement of pivot bush 42 lengthwise of slot 43.

Figure 7:
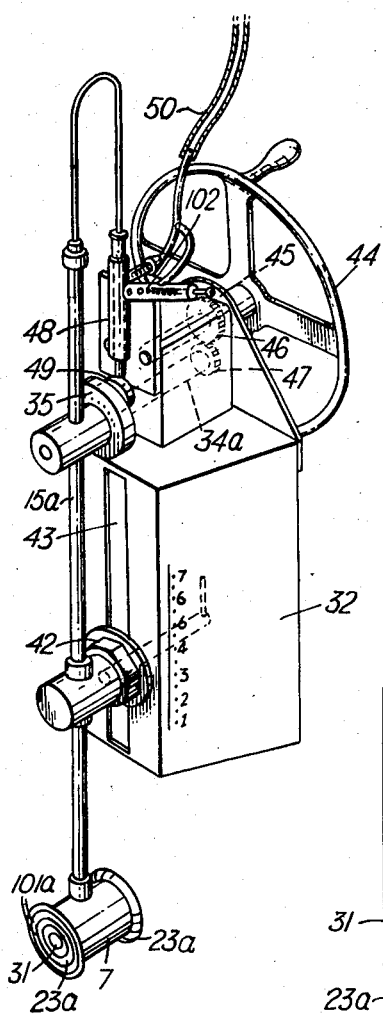
Figure 7 is a perspective view of a modified form of the apparatus shown in Figure 5.

Figure 7 illustrates diagrammatically a modified form of the apparatus illustrated in Figure 5. The apparatus shown in Figure 7 is adapted for manual operation by a handwheel 44 which can be fitted at the will of the operator either to a shaft 34a or to a subshaft 45 which is connected by gears 46, 47 to shaft 34a. The ratio of gears 46, 47 is 2:1. In this embodiment of the invention the fluid pressure applied through shaft 15a is hydraulic, e.g. oil pressure, and to this end a plunger pump 48, e.g. of the kind having ball inlet and outlet valves and operated by a cam 49 on shaft 34a is connected, through suitable valves and pressure gauges, to the tubular shaft 15a and by a flexible tube 50 to a liquid reservoir, not shown. The pressure may be regulated by a spring-loaded ball valve 102 on the pump output side which releases liquid back to the reservoir when the pressure rises unduly. Operation of this apparatus is similar to that described above with reference to Figures 5 and 6.

Figure 8:
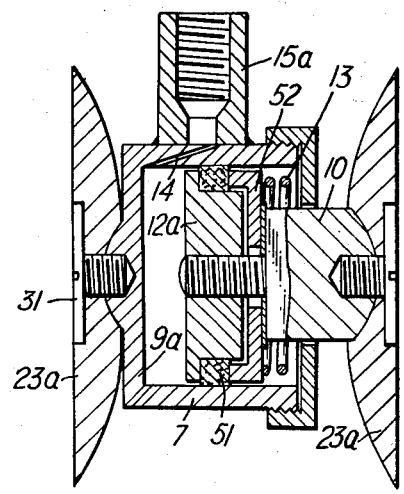
Figure 8 illustrates an alternative form of piston for use with any of the forms of apparatus shown in Figures 1, 5 or 7.

Figure 8 illustrates a preferred form of piston for use in the cylinder 7 and which comprises a piston body 12a surrounded by a packing washer 51, made for example of asbestos, which is clamped between the body 12a and a piston cap 52.

In Figure 9, lapping discs 23a are pressed apart from one another onto respective opposed valve seats 3 and 4 the planes of which include a wedge angle by pneumatic pressure within a cylinder 7. At one end of the cylinder the cover thereof is formed with a protrusion 111 of which the surface 112 is a spherical cap; at the other end of the cylinder a piston rod 10 projects through an aperture in a cover plate 11 and the external end of the rod 10 is formed with a surface 113 which is also a spherical cap. The spherical surfaces 112 and 113 engage respective similarly shaped surfaces 114 in the lapping discs, which discs are retained to the cylinder cover and to the rod by screws 31.

The cylinder contains a piston 12 having an annular groove 115 therearound for a so-called O-ring seal 116. A boss 117 on one side of the piston engages the rod 10. The force of a spring 13 around the rod 10 within the cylinder opposes the force of the pneumatic pressure within the cylinder, which is led through a bore or bores 14 in the cylinder wall to the side of the piston other than that of the rod 10.

The cylinder 7 is supported for movement in a gyratory motion as described with reference to Figures 5 to 8 by a shaft 15a through a central passageway of which the pressure of pneumatic fluid, supplied through a regulator as described with reference to Figures 1 to 4, may be led to the bore or bores 14.

Four locating pins 118, two of which extend from one lapping disc and two from the other, are arranged forkwise as regards the shaft 15a to prevent the rotation of the lapping discs.

During the gyratory motion of the cylinder 7, given thereto by the combination of the longitudinal and angular reciprocations of the shaft 15a, the piston 12 will reciprocate within the cylinder 7 while the pneumatic pressure maintains the desired engagement between the lapping discs and the respective valve seat faces.

It will be understood that lapping apparatus according to the invention is very light and inexpensive and, in operation, the apparatus leaves ample space whereby the operator can observe the seats being lapped. Further, a minimum of time is required to effect fitting of the apparatus to a valve body and to dismantle the apparatus from the valve body.

I claim:

1. Apparatus for lapping opposed valve seats, wherein the laps are connectable to supports therefor carried by a mounting in a manner such that one lap is movable towards and away from the other, said mounting being adapted for connection with a source of fluid pressure application of which to the mounting is operative to urge the laps into lapping relation with the valve seats and to maintain the desired lapping relation between the laps and the seats, and comprising a cylinder having one closed end adapted to have one lap attached thereto, an axially movable piston housed in the cylinder and a rod connected to the piston and having its outer end projecting through the other end of the cylinder and adapted to have the other of the laps attached thereto, and there are provided a shaft, secured to the cylinder, a rotatable eccentric connected to the shaft and having its axis of rotation at right angles to the axis of the shaft, and a pivot having its axis at right angles to the axis of the shaft and co-operating with the shaft at a position between the eccentric and the cylinder, said eccentric and pivot co-operating to impart a gyratory movement to the cylinder relative to valve seats thereby to effect lapping of the seats.

2. Apparatus for lapping opposed seats of a valve, comprising a cylinder, a support on said cylinder, a lap adapted for lapping a seat of the valve and mounted on said support, a piston movable in said cylinder, a support on said piston, a lap adapted for lapping a seat of the valve opposite the first-mentioned seat and mounted on the second-mentioned support, piston-biasing means including a spring in engagement with the piston arranged to urge the piston in the direction in the cylinder corresponding to the reduction of distance between the laps, and means providing for the application of fluid pressure to the interior of the cylinder to urge the piston in the direction in the cylinder corresponding to the increase of distance between the laps.

3. Apparatus for lapping opposed seats of a parallel-slide valve, comprising a cylinder, a support on said cylinder, a lap adapted for lapping a seat of the valve and non-rotatably mounted on said support, a piston movable in said cylinder, a bearing on said cylinder, a support on said piston slidably and non-rotatably mounted in said bearing, a lap adapted for lapping a seat of the valve opposite the first-mentioned seat and non-rotatably mounted on the second-mentioned support, piston-biasing means including a spring in engagement with the piston arranged to urge the piston in the direction in the cylinder corresponding to the reduction of distance between the laps, actuating means operable for rotating the cylinder, and means including a fluid-tight annular chamber surrounding the cylinder within which the cylinder is rotatably mounted providing for the application of fluid pressure to the interior of the cylinder to urge the piston in the direction in the cylinder corresponding to the increase of distance between the laps.

4. Apparatus as claimed in claim 3, wherein the support on the piston comprises a square-section rod.

5. Apparatus as claimed in claim 3, wherein the cylinder is rotatable about its axis during a lapping operation by a ratchet wheel movable with the cylinder, rotation of the cylinder being effected by a pawl co-operating with the ratchet wheel and supported for rocking movement about said axis under control of a connecting rod adapted for connection with said actuating means.

6. Apparatus as claimed in claim 3, wherein the cylinder is rotatable about its axis during a lapping operation by a ratchet wheel movable with the cylinder, rotation of the cylinder being effected by a pawl co-operating with the ratchet wheel and supported for rocking movement about said axis under control of a connecting rod adapted for connection with said actuating means, and each lap is provided with rollers extending from the outer face thereof to locate the lap relative to a valve seat to be lapped thereby, to support the cylinder for rotation about its axis, and to determine the extent of oscillation of the laps relative to the seats during rotation of the laps.

7. Apparatus as claimed in claim 3, wherein each lap is provided with rollers extending from the outer face thereof to locate the lap relative to a valve seat to be lapped thereby, to support the cylinder for rotation about its axis, and to determine the extent of oscillation of the laps relative to the seats during rotation of the laps.

8. Apparatus for lapping opposed seats of a valve, comprising a cylinder, a support on said cylinder, a lap adapted for lapping of a seat of the valve and mounted on said support, a piston movable in said cylinder, a support on said piston, a lap adapted for lapping a seat of the valve opposite the first-mentioned seat and mounted on the second-mentioned support, piston-biasing means including a spring in engagement with the piston arranged to urge the piston in the direction in the cylinder corresponding to the reduction of distance between the laps, a connecting rod secured to the cylinder, a rotatable eccentric connected to the connecting rod and having its axis of rotation at right angles to the axis of the connecting rod, a pivot having its axis at right angles to the axis of the connecting rod and co-operating with the connecting rod at a position between the eccentric and the cylinder, said eccentric and pivot co-operating to impart a gyratory movement to the cylinder relative to valve seats thereby to effect lapping of the seats, and means providing for the application of fluid pressure to the interior of the cylinder to urge the piston in the direction in the cylinder corresponding to the increase of distance between the laps.

9. Apparatus as claimed in claim 8, wherein the connecting rod comprises a tubular shaft which communicates with the interior of the cylinder to permit the application of the said fluid pressure thereto.

10. Apparatus as claimed in claim 8, wherein the connecting rod comprises a tubular shaft which communicates with the interior of the cylinder to permit the application of the said fluid pressure thereto and there is provided a fluid pump coupled for drive simultaneously with the eccentric for providing the pressure of fluid.

11. Apparatus as claimed in claim 9, wherein there is provided a pressure-relief valve associated with the pressure side of the pump.

12. Apparatus as claimed in claim 8, wherein there is provided a fluid pump coupled for drive simultaneously with the eccentric for providing the pressure of fluid.

References Cited in the file of this patent

UNITED STATES PATENTS

| | | |
|---|---|---|
| 1,091,918 | Eynon | Mar. 31, 1914 |
| 1,993,844 | Karnath | Mar. 12, 1935 |
| 2,360,550 | Culp | Oct. 17, 1944 |
| 2,674,069 | Baner | Apr. 6, 1954 |